Figure 1:
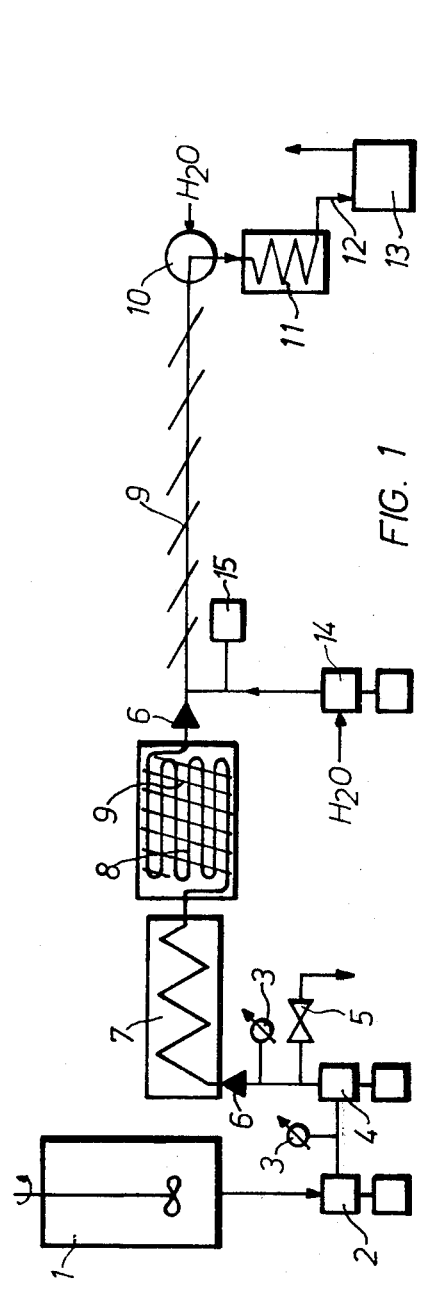

United States Patent [19]

Huppertz et al.

[11] 4,002,654

[45] Jan. 11, 1977

[54] PROCESS FOR THE PREPARATION OF DIHYDROXYANTHRAQUINONES

[75] Inventors: Andreas Huppertz, Cologne-Mulheim; Peter Schultz, Leverkusen; Dieter Maertens, Schildgen, all of Germany

[73] Assignee: Bayer Aktiengesellschaft, Leverkusen, Germany

[22] Filed: Sept. 19, 1975

[21] Appl. No.: 615,101

[30] Foreign Application Priority Data

Sept. 21, 1974 Germany ............ 2445221

[52] U.S. Cl. .................. 260/383
[51] Int. Cl.² .................. C07C 49/75
[58] Field of Search .................. 260/383

[56] References Cited

UNITED STATES PATENTS

| 755,801 | 3/1904 | Schmidt et al. | 260/383 |
|---|---|---|---|
| 765,201 | 7/1904 | Schmidt et al. | 260/383 |
| 765,637 | 7/1904 | Schmidt et al. | 260/383 |
| 1,855,318 | 4/1932 | Schmidt | 260/383 X |
| 3,906,013 | 9/1975 | Reubke et al. | 260/383 |

FOREIGN PATENTS OR APPLICATIONS

25,541   9/1904   United Kingdom ............ 260/383

*Primary Examiner*—Daniel E. Wyman
*Assistant Examiner*—Thomas A. Waltz
*Attorney, Agent, or Firm*—Plumley and Tyner

[57] ABSTRACT

The invention relates to a process for the preparation of 1,5-dihydroxyanthraquinone and 1,8-dihydroxyanthraquinone and of their mixtures. Alkali metal salts or alkaline earth metal salts of the corresponding anthraquinonedisulphonic acid are treated, in an aqueous medium under pressure and at elevated temperatures, with lime, buffer substances and, if appropriate, oxidizing agents, a surface-active agent is added to the resulting reaction mixture and the mixture is then acidified in a continuous process with mineral acid at temperatures of 50° C to 150° C and a pressure of 1–3 bars, and the dihydroxyanthraquinone which has precipitated is isolated. Compared to the known procedure, the process according to the invention is distinguished by a substantially improved space-time yield with at least equal purity of the reaction products.

13 Claims, 2 Drawing Figures

PROCESS FOR THE PREPARATION OF DIHYDROXYANTHRAQUINONES

The present invention relates to a process for the preparation of 1,5-dihydroxyanthraquinone and 1,8-dihydroxyanthraquinone and of their mixtures, which is characterised in that alkali metal salts or alkaline earth metal salts of the corresponding anthraquinonedisulphonic acid are treated, in an aqueous medium under pressure and at elevated temperatures, with lime, buffer substances and, if appropriate, oxidising agents, a surface-active agent is added to the resulting reaction mixture and the mixture is then acidified in a continuous process with mineral acid at temperatures of 50° to 150° C and a pressure of 1-3 bars, and the dihydroxyanthraquinone which has precipitated is isolated.

The first stage of this process, the so-called "lime melt" can be carried out in a known manner (compare Bios Final Report 1484, page 16 and Fiat Report 1313 II, page 57), wherein an aqueous slurry of the sodium salts of the disulphonic acids, lime and magnesium chloride (as buffer substances) is heated for 10 to 12 hours to 230° C in an autoclave.

Possible oxidising agents which may optionally be added in this process are sodium chlorate and potassium chlorate, nitrobenzenesulphonic acids and preferably sodium nitrate and potassium nitrate.

According to a preferred embodiment of the first stage of the process according to the invention, the process is, however, suitably carried out at temperatures of 290°-370° C, preferably 300°-340° C, and pressures of 50-200 bars, preferably 88-150 bars. In this way it proves possible to reduce the reaction time of the "lime melt" to 10-15 minutes.

If desired, this reaction variant can also be carried out continuously.

In order to prevent the reaction melt from caking to the reactor wall and hence prevent blockage of the plant, the continuous process is carried out in a tubular mixer which, through employing controlled values of the flow velocity, makes it possible to achieve a uniform temperature distribution over the cross-section of the reactor.

In addition, it is also possible to prevent a deposit from forming on the wall of the tube or apparatus by intermittently lowering the pressure. Suitably, the melt is first preheated to 200°-210° C with steam at 30 bars (= 230°). Thereafter, the melt is heated electrically in the reactor to 330°-340° C, via a control system. The reaction apparatus is shown in FIG. 1. In detail, the apparatus operates as follows: an aqueous homogenised suspension of 1,5- or 1,8-anthraquinonedisulphonic acid (Na salt), lime, buffer substance and oxidising agent is held in the holding vessel 1. A stirrer prevents sedimentation. Water at 20° C is used for emptying the apparatus. A pump 2 produces an input pressure of 3 bars and a feed-back brings excess delivered product to the suction side of the pump. The pressure is checked on the manometer 3. A second gear pump 4 raises the pressure to 80-100 bars. The safety valve 5 prevents an excessive pressure arising in the system. The pressure in the reaction system is monitored by means of the manometer 3. A non-return ball valve 6 prevents the pressure from being lost in the direction of the pump. A heat exchanger 7 heated with steam at 30 bars raises the temperature to 210° C. The exit temperature from the exchanger is measured by means of a thermocouple built into the product stream. The subsequent pipe bundle is heated electrically. The electrical heating is regulated to the range of intended values by means of a thermocouple. In order to achieve as uniform a temperature profile as possible over the reactor cross-section, a tubular mixer 9 was fitted and the temperature was measured by means of a thermocouple built into the product stream. A non-return ball valve 6 prevents water at 80° C from possibly entering the reactor circuit. Water — for diluting the melt and for cooling — and finished melt are mixed with one another in a tubular mixer 9. The wall temperature is tested by means of a glass thermometer. The mixture is let down to atmospheric pressure via the precision let-down needle valve or via a let-down stopcock 10. The melt is cooled to 100° C in a tubular cooler 11 and is collected in a vessel 13, which has been made ready for the purpose, via the letdown nozzle 12. The mixture is worked up from this vessel. At a throughput of 35 l/hour, the average residence time is 11-12 minutes.

The reaction can be carried out in very diverse types of reactor, for example in a tubular reactor, in a stirred kettle cascade, in a kneader, in a chamber reactor or a cellar reactor. The discharge of the reaction product is of particular difficulty when the reaction is carried out continuously. This fundamental difficulty has been countered in two ways. Firstly, the pressure was let down via a precision needle valve, but at the same time water was fed in, upstream from the valve, by an additional pump, under the reaction pressure and with cooling. Secondly, it is possible to let down the pressure via a rotating angle stopcock or three-way stopcock, into which melt and water are pumped alternately. Here, the water fed in not only dilutes and cools the melt, but the product pipeline is also flushed free periodically by the water fed in. The letdown melt is then charged, via a subsequent vaporisation jet, into an intermediate vessel for subsequent acid working up by means of mineral acids, preferably hydrochloric acid, this working up being carried out, according to the invention, by a continuous method.

For this purpose, a suitable procedure is to introduce the alkaline aqueous "lime melt", after the addition of a surface-active agent, continuously from above into the first cascade-connected extractive boiler, which is first charged with a charge which has been discontinuously worked up with acid, so that the suspension is constantly kept at between pH 1 and pH 0 by appropriate supply of acid. The extractive boiler can be heated either directly or indirectly. In the case of direct heating, steam at 5 bars is fed in through a control valve, so that the temperature of the melt is constant in the intended range of 95°-105° C. In this temperature range, the reaction velocity is also constant, in accordance with the temperature of the melt. The suspension from the acid working up must now, after an average residence time of 1-2 hours, be passed from the first extractive boiler, from below, to the second extractive boiler, of corresponding size, at a certain height, whilst keeping the pH value at between pH 1 and pH 0 by further addition of acid and keeping the temperature of the melt constant within the intended range of 95°-105° C by direct steam heating. The finished worked-up acid suspension is withdrawn through the bottom outlet of the second boiler by means of a heat-resistant, acid-resistant and erosion-resistant pump and pumped into a rotary filter receiver. A level controller, which — via a bypass line, controls the amount of product withdrawn — keeps the level of the two communicating boilers constant. This thus ensures an average total residence time of 2-4 hours. Over-filling or emptying of the two boilers is thus not possible.

The isolation of the dihydroxyanthraquinone reaction product is also advantageously carried out continuously by means of a rotary filter. Finally, the product can also be dried continuously in the usual manner.

The addition, mentioned earlier, of surface-active agents to the "lime melt" has proved advantageous inter alia because the minimum crystal size required for rotary filtration can be achieved thereby.

In general, small additions of surface-active agent, that is to say additions of 0.1-2% by weight, relative to the amount of anthraquinonedisulphonic acids employed, are sufficient.

Suitable surface-active agents are, above all, those of non-ionic nature, such as, for example, oxethylated condensation products of phenol and p-methylstyrene (with 15-30 mols of ethylene oxide), oxethylated oleyl alcohol (with 20 mols of ethylene oxide), as well as, preferably, oxethylated condensation products of p-hydroxydiphenyl and benzoyl chloride (with 15-20 mols of ethylene oxide).

Compared to the known procedure, the process according to the invention is distinguished by a substantially improved space-time yield with at least equal purity of the reaction products.

A useful side-effect achieved in the process according to the invention is a continuous and constant production of $SO_2$, which is a great advantage compared to the surge-like production (of $SO_2$) in batchwise operation. The total average residence time of 2-4 hours in the cascade for acid working-up is sufficiently long, under the reaction conditions, to lower the $SO_2$ content of the suspension to a value of less than 1%.

The new process, in particular the continuous acid working-up, will be explained in more detail with the aid of the example which follows:

EXAMPLE 1

(compare FIG. 1)

An aqueous homogeneous suspension of the following starting materials: 8.2 kg of moist approx. 74% strength mono-K salt of anthraquinone-1,8-disulphonic acid = 6.0 kg of 100% strength dry mono-K salt of anthraquinone-1,8-disulphonic acid = 5.4 kg of 100% strength dry anthraquinone-1,8-disulphonic acid, 3.75 kg of lime, 4.25 l of approx. 28.7% strength $MgCl_2$ solution = 1.55 kg of 100% strength (dry) $MgCl_2$, 0.06 kg of $NaNO_3$ and 49.00 l of water, representing a total volume of 60 l, is taken from a holding vessel 1, brought to an input pressure of 3 bars by a pre-compression gear pump 2 and fed to a gear pump 4 which raises the pressure to 80-100 bars and delivers 34 l/hour at 80 revolutions per minute. From here, the melt passes into a preheater 7 which is indirectly preheated with steam at 30 bars and about 230° C and which is followed by the reactor tube 8, which is electrically heated to 300°-340° C and is temperature-controlled, and the tubular mixer 9. After the reactor, water under the reaction pressure is introduced, via a metering pump 14 with a pressure-balancing vessel 15, into the reaction melt in a tubular mixer 9, to dilute and cool the melt, and then let down via an angle valve 10, cooled, by means of an evaporative cooler 11, to about 100° C, and run off 13, via a letdown nozzle 12, into an intermediate vessel, from which the melt is then subjected to acid working-up. With the pump 4 delivering 34 l/hour at 80 revolutions per minute, a reaction time of about 12 minutes in the reactor is achieved.

The yield is: 2.03 kg of dry 1,8-dihydroxyanthraquinone per hour = 3.58 kg of dry 1,8-dihydroxyanthraquinone per batch = 3.34 kg of 100% strength dry 1,8-dihydroxyanthraquinone = 94.9% of theory, the purity of the material being: 93.5% of 1,8-dihydroxyanthraquinone, 1.3% of pyridine-insolubles, 3.1% of water-soluble organic compound, 0.4% of water and 0.1% of ash. The %-ages, calculated relative to anhydrous and ash-free substance are: 2.7% of 1-hydroxyanthraquinone, 0.2% of anthraquinone and 94.0% of 1,8-dihydroxyanthraquinone.

EXAMPLE 2

Figure 2:
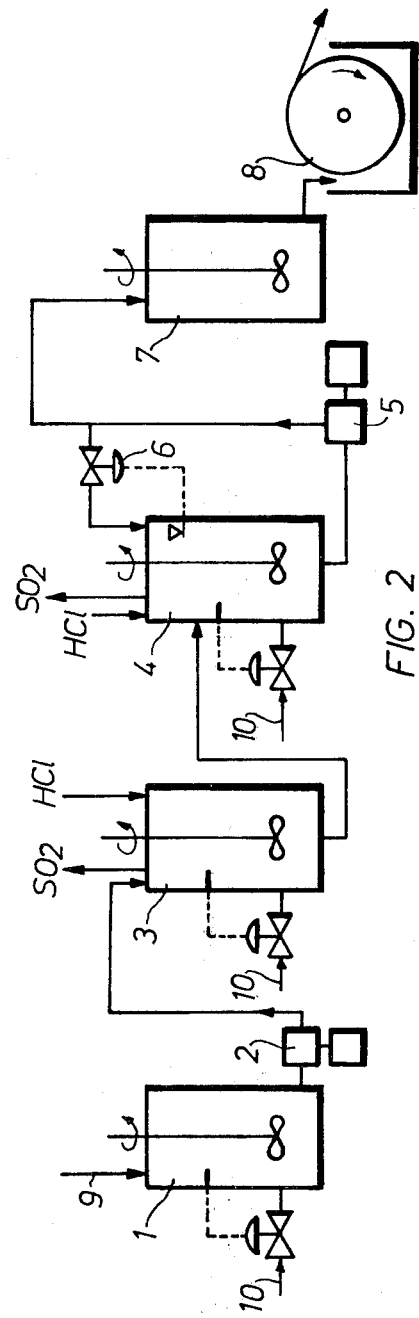

(compare FIG. 2)

About 6 cubic meters per hour of a finished reaction melt 9 of 3,100 l of moist approx. 62% strength anthraquinone-1,8-disulphonic acid (mono-potassium salt) = 1,920 kg of 100% strength dry anthraquinone-1,8-disulphonic acid (mono-potassium salt) = 1,738 kg of dry 100% strength anthraquinone-1,8-disulphonic acid, 1,200 kg of lime, 1,400 l of $MgCl_2$ solution, of density 1.27 and approx. 28.7% strength = 510 kg of dry 100% strength $MgCl_2$, 20 kg of $NaNO_3$ and 5 kg of Emulgator W (a condensation product of p-hydroxydiphenol with benzoyl chloride and addition of ethylene oxide), made up to 20,000 l with water, at 85° C, are pumped continuously from a kettle 1, via an infinitely variable spiral pump 2, from above into a suspension of 1,8-dihydroxyanthraquinone in hydrochloric acid, into a kettle 3 having an acid brick lining. The kettle 3 is directly heated with steam 10 at 5 bars, the heating being controlled to the intended value of 98° C in accordance with the internal temperature of the kettle. At the same time, about 2,000 l/hour of 30% strength HCl are allowed to run in continuously via a (flow) meter. The $SO_2$ gas liberated, which is produced approximately in an amount of 150 kg/hour is passed via a gas pipeline to an $SO_2$ absorption installation. The acid suspension is passed from below to a second extractive boiler 4, in cascade arrangement, at a certain height. In the kettle 4, 30% strength HCl is again introduced continuously via a meter, this time in an amount of about 1,000 l/hour. The remaining $SO_2$ gas liberated, amounting to 33 kg/hour, is fed via gas pipeline to an $SO_2$ absorption installation. Direct heating, with steam at 5 bars, in accordance with the internal temperature of the kettle, which is also regulated to the intended value, keeps the extraction temperatures at 98° C. The extracted suspension of 1,8-dihydroxyanthraquinone is now withdrawn from the bottom of the kettle 4 via a corrosion-resistant, heat-resistant and erosion-resistant centrifugal pump 5. A level regulator 6, which regulates the amount of product withdrawn via a bypass pipeline, keeps constant the level to which the two communicating kettles are filled. Accordingly, an average residence time of 3.3 hours is ensured. Over-filling, or complete emptying, is not possible.

The yield is 325 kg of dry 1,8-dihydroxyanthraquinone per hour = 1,077 kg of dry 1,8-dihydroxyanthraquinone per batch = 1,020 kg of 1,8-dihydroxyanthraquinone = 90% of theory, the purity being 94.7% of 1,8-dihydroxyanthraquinone, 0.9% of pyridine-insolubles, 1.4% of water-soluble organic substance, 0.2% of water and 1.0% of ash.

%-ages calculated relative to anhydrous and ash-free substance: 2.3% of 1-hydroxyanthraquinone, 0.2% of anthraquinone and 96.1% of 1,8-dihydroxyanthraquinone.

Kettle 1: 20 m³ kettle, steel, stirrer, thermometer, direct 5 bars steam heating.

Pump 2: spiral pump with variable gearbox, delivery 1–9 m³/hour.

Cascade kettles 3 + 4: each a 20 m³ kettle, rubber-lined, acid brick lined with SW 20 and jointed with CN, useful volume 15 m³, HCl inlet, direct 5 bar steam heating, stirrer, thermometer and SO₂ off-gas pipeline.

Pump 5: centrifugal pump, all parts which come into contact with the product made of PPH, 290 revolutions per minute, delivery head 30 m liquid column, delivery 28 m³/hour, double-acting slip-ring seal.

EXAMPLE 3

(compare FIG. 2)

About 6 m³/hour of a finished reaction melt 9 of 1,430 kg of anthraquinone-1,5-disulphonic acid (moist sodium salt, about 77% strength) = 1,100 kg of anthraquinone-1,5-disulphonate (sodium salt, 100% strength) = 982 kg of dry 100% strength anthraquinone-1,5-disulphonic acid, 770 kg of lime and 770 l of an approx. 28.7% strength $MgCl_2$ solution = 280 kg of dry 100% strength $MgCl_2$, made up to 13,000 l with water, at 85° C, are pumped continuously from a kettle 1, via an infinitely variable spiral pump 2, from above into a suspension of 1,5-dihydroxyanthraquinone in hydrochloric acid, into a kettle 3 having an acid brick lining. The kettle 3 is heated directly to about 98° C with steam at 5 bars, the heating being controlled to the intended value in accordance with the internal temperature in the kettle. At the same time, about 1,200 l/hour of 30% strength HCl are introduced continuously via a meter. The $SO_2$ gas liberated, which is produced in an amount of about 125 kg/hour, is passed via a glass pipeline to an $SO_2$ adsorption installation. The acid suspension is fed from below to a second extractive boiler 4 arranged in cascade, at a certain height. In the kettle 4 30% strength HCl is again introduced continuously via a meter, this time in an amount of about 600 l/hour. The remaining $SO_2$ gas liberated, amounting to about 30 kg/hour, is passed via a glass pipeline to an $SO_2$ adsorption installation. A 5-bar steam heating system, which is also controlled to the intended value in accordance with the internal temperature of the kettle, keeps the extraction temperature at 98° C. The extracted suspension of 1,5-dihydroxyanthraquinone is now withdrawn from the kettle 4, from below, via a corrosion-resistant, heat-resistant and erosion-resistant centrifugal pump 5. A level regulator 6, which, via a bypass pipeline, controls the amount of product withdrawn, keeps the level of the contents of the two communicating kettles constant. This thus ensures an average residence time of 2.2 hours. Over-filling and complete emptying are not possible.

The yield is: 265 kg of (dry) 1,5-dihydroxyanthraquinone per hour = 583 kg of (dry) 1,5-dihydroxyanthraquinone per batch = 514 g of (dry) 100% strength 1,5-dihydroxyanthraquinone = 80.3% of theory, the purity being 85.0–88.0% of 1,5-dihydroxyanthraquinone, 2.5–4.0% of 1,2,5-trihydroxyanthraquinone, 1.5–2.5% of 1,6- and 1,7-dihydroxyanthraquinone and up to 2.0% of 1-hydroxyanthraquinone and 1,8-dihydroxyanthraquinone, the remainder being insoluble matter.

EXAMPLE 4

(compare FIG. 1)

An aqueous homogenised suspension of the following starting materials: 8.0 kg of moist approx. 77% strength di-Na anthraquinone-1,5-disulphonate = 6.2 kg of dry 100% strength di-Na anthraquinone-1,5-disulphonate = 5.5 kg of dry 100% strength anthraquinone-1,5-disulphonic acid, 4.3 kg of lime, 4.3 l of approx. 28.7% strength $MgCl_2$ solution = 1.57 kg of dry 100% strength $MgCl_2$ and 49 l of water, representing a total volume of 60 l, is taken from a holding vessel 1, brought to an input pressure of 3 bars by a pre-compression gear pump 2 and fed to a gear pump 4 which raises the pressure to 80–100 bars and delivers 34 l/hour at 80 revolutions per minute. From here, the melt passes into a preheater 7 which is indirectly preheated with steam at 30 bars and about 230° C and which is followed by the reactor tube 8, which is electrically heated to 300°–340° C and is temperature-controlled, and the tubular mixer 9. After the reactor, water under the reaction pressure is introduced, via a metering pump 14 with a pressure-balancing vessel 15, into the reaction melt in a tubular mixer 9, to dilute and cool the melt, and then let down via an angle valve 10, cooled, by means of an evaporative cooler 11, to about 100° C, and run off 13, via a let-down nozzle 12, into an intermediate vessel, from which the melt is then subjected to acid working-up. With the pump 4 delivering about 34 l/hour at 80 revolutions per minute, a reaction time of about 12 minutes in the reactor is achieved.

The yield is: 1.97 kg of dry 1,5-dihyroxyanthraquinone per hour = 3.46 kg of dry 1,5-dihydroxyanthraquinone per batch = 3.05 kg of dry 100% strength 1,5-dihydroxyanthraquinone = 85.0% of theory, the purity being 88.1% of 1,5-dihydroxyanthraquinone, 3.0% of 1,2,5-trihydroxyanthraquinone, 2.0% of 1,6- and 1,7-dihydroxyanthraquinone, up to 2% of 1- and 1,8-dihydroxyanthraquinone, remainder insoluble matter.

We claim:

1. In a lime melt process for the preparation of 1,5-dihydroxyanthraquinone and 1,8-dihydroxyanthraquinone and mixtures thereof from alkali metal or alkaline earth metal salts of the corresponding anthraquinone disulfonic acids wherein said salts are treated in an aqueous medium under pressure and at elevated temperatures with lime and buffer substances to form a lime melt reaction mixture, the improvement comprising carrying out said lime melt process at temperatures from about 290° C to about 370° C and at pressures from about 50 to about 200 bars and subsequently continuously acidifying said reaction mixture with mineral acid to precipitate said dihydroxyanthraquinones.

2. The process of claim 1 wherein a non-ionic surfactant is added to said reaction mixture prior to the acidification thereof.

3. Process according to claim 2, characterised in that an oxethylated condensation product of p-hydroxydiphenyl with benzoyl chloride is employed as the surface-active agent.

4. The process of claim 1 wherein the acidification of the reaction mixture is carried out at temperatures of from about 50° C to about 150° C and at a pressure of from about 1 to about 3 bars.

5. Process according to claim 4, characterised in that the treatment with mineral acid is carried out in the temperature range of 95° to 105° C.

6. The process of claim 1 wherein the "lime melt" reaction mixture further includes an oxidizing agent.

7. Process according to claim 6, characterised in that sodium nitrate is employed as the oxidising agent.

8. The process of claim 1 wherein said "lime melt" process is carried out continuously.

9. The process of claim 8 wherein said "lime melt" process is carried out at temperatures from about 300° C to about 340° C and at pressures from about 88 to about 150 bars.

10. Process according to claim 1, characterised in that the sodium or potassium salts of 1,5-anthraquinonedisulphonic acid or 1,8-anthraquinonedisulphonic acid are employed.

11. Process according to claim 1, characterised in that magnesium chloride is employed as the buffer substance.

12. Process according to claim 1, characterised in that the treatment with mineral acid is carried out continuously in a multi-stage cascade.

13. Process according to claim 1, characterised in that the reaction is carried out continuously in a pressure reactor.

* * * * *